April 1, 1930.  L. W. GOBBLE  1,752,378
AIRPLANE WING SECTION
Filed March 23, 1929
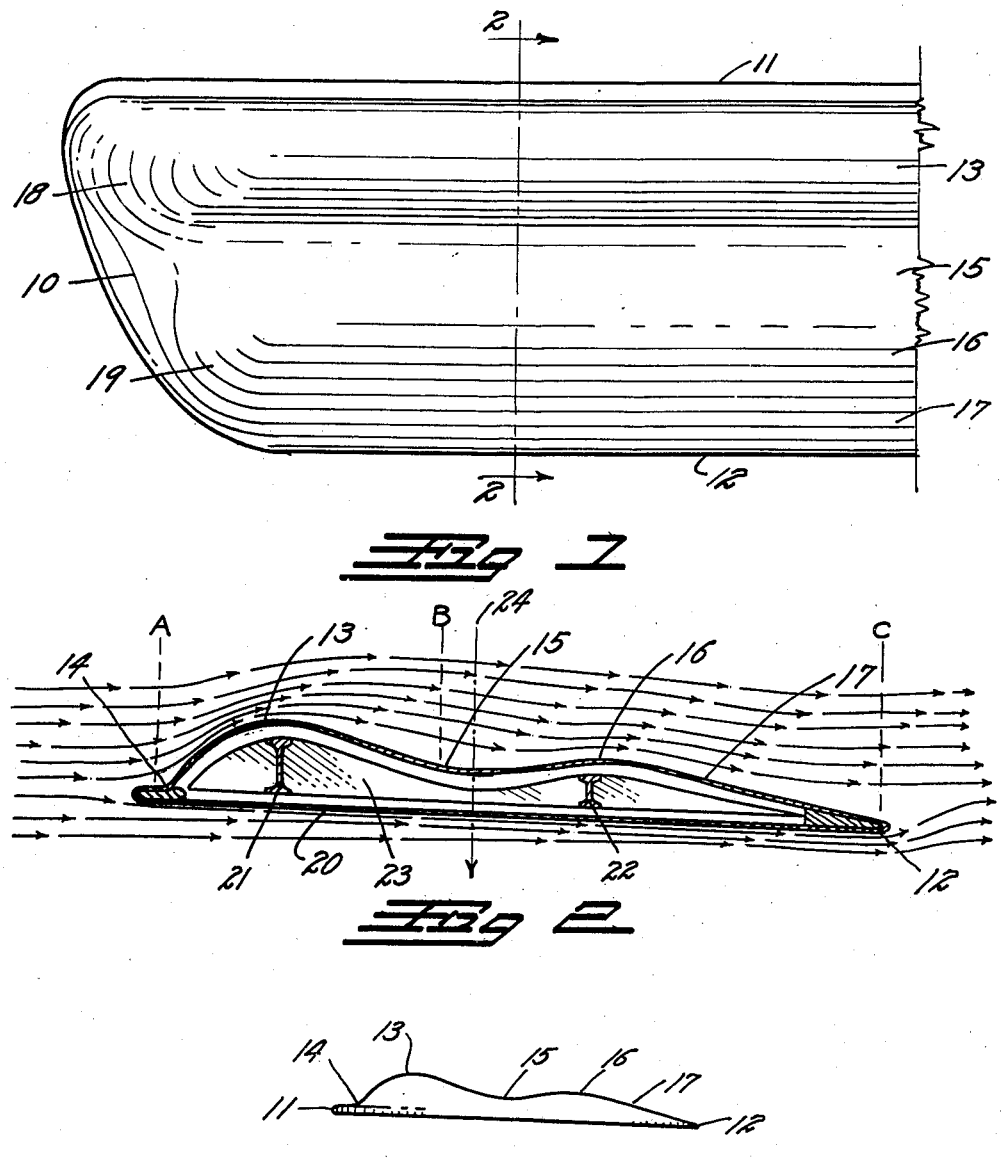
Inventor
LEW WALLACE GOBBLE
Attorney Patented Apr. 1, 1930

1,752,378

UNITED STATES PATENT OFFICE

LEW WALLACE GOBBLE, OF GRAND JUNCTION, COLORADO

AIRPLANE-WING SECTION

Application filed March 23, 1929. Serial No. 349,303.

This invention relates to a wing section for airplanes and has for its principal object the provision of a wing section which will offer less head resistance and greater lifting capacity than present types of wing sections.

Another object of this invention is to provide a wing section in which the major portion of the lifting upon the upper surface is directly over the center of gravity of the wing, so as to impart a stabilizing action upon the wing.

A further object of this invention is to provide a wing section which will allow a lower landing speed and quicker takeoff with less liability of stalling than the present wing sections.

Other objects and advantages reside in the detail construction of the invention, which is designed for simplicity, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a plan view of a wing in which the invention is embodied.

Fig. 2 is an enlarged cross section therethrough taken on the line 2—2, Fig. 1. In this view a stream line diagram is indicated by arrow lines.

Fig. 3 is an end elevation of the wing of Fig. 1.

In the drawing, the wing is designated in its entirety by the numeral 10 with its leading edge at 11, and trailing edge at 12. The leading edge of the wing is constructed with a very thin vertical thickness as illustrated in Fig. 2. Immediately back of the leading edge is a comparatively sharp and abrupt rise in the upper surface producing a forward ridge 13 which extends longitudinally of the wing. The curve of the rise of the ridge 13 follows a stream line contour and approximates a parabola. Between the thin leading edge 11 and the base of the ridge 13 a front vacuum pocket 14 is formed.

To the rear of the ridge 13 the upper surface is sloped downwardly and rearwardly in a more gradual curve to a valley 15. From the valley 15 the surface again rises to a second ridge 16, thence trails downwardly in an inclined, plane surface 17 to the trailing edge 12 which is comparatively sharp. The second ridge 16 has a much more gradual apex than the forward ridge 13. The ridges 13 and 16 preferably fade out or curve downwardly as indicated at 18 and 19, respectively, toward the wing tips, so that the edge at the tips has practically the same thickness as the leading and trailing edges 11 and 12.

The lower surface of the wing, indicated at 20, is a flat plane arranged to be carried at any desired angle of incidence, such as illustrated in Fig. 2.

The ridges 13 and 16 provide ample space for longérons 21 and 22, respectively, which pass through and support lateral plate ribs 23. This construction gives the wing unusual rigidity in that it has four continuous longitudinal members comprising the two longérons 21 and 22 and the leading and trailing edge members, with ample interior space for cross bracing and trussing.

In Fig. 2 the air stream lines have been indicated by the arrow lines. It will be noted that, as the wing enters the air current, a sharp cleavage is provided by the leading edge 11 which splits the air current with very little resistance. The currents passing over the upper surface of the wing must travel a greater distance than the currents passing below the upper surface, resulting in a rarefied atmosphere above the entire wing, the suction of which assists the pressure on the lower surface in lifting the wing.

In addition to the rarefied atmosphere over the entire wing the lift is increased by three distinct lines of partial vacuum; one over the forward pocket 14, one in the valley 15, and one over the trailing edge 12, as illustrated at "A", "B", and "C", respectively.

The air current in flowing over the comparatively sharp ridge 14 is forced upwardly above the valley 15 and owing to its velocity can not fill the pocket but passes thereover. This results in a partial vacuum in the pocket 15 directly over the center of gravity of the wing. The vacuum in the pocket 15 is increased by the ejector action of the rapidly moving air currents thereover, which serve to rapidly draw away any air which may be contained in the pocket.

The second ridge 16 again forces the air currents upwardly so that they can not follow down the inclined plane 17. This creates a third rarefied pocket at "C", directly over the trailing edge. The plane will be literally supported by three distinct forces, at "A", "B", and "C", in addition to the general rarefied atmosphere over the wing and the pressure on the under surface thereof. The force "B" is the greater of the three upward forces, and acts to stabilize the lifting action.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. A wing section for airplanes outlined by a substantially straight lower line; a relatively long undulating upper line; the undulations in said upper line comprising: a forward ridge; a rearward ridge separated by a relatively deep valley; and a relatively thin projecting leading edge extending beyond said forward ridge.

2. A wing section for airplanes outlined by a substantially straight lower line; a relatively long undulating upper line, the undulations in said upper line comprising: a forward ridge; a rearward ridge separated by a relatively deep valley; and a relatively thin projecting leading edge extending beyond said forward ridge, said forward ridge extending upwardly on a parabolic curve from said relatively thin leading edge.

3. A wing section for airplanes outlined by a substantially straight lower line; a relatively long undulating upper line, the undulations in said upper line comprising: a forward ridge; a rearward ridge separated by a relatively deep valley; and a relatively thin projecting leading edge extending beyond said forward ridge, said forward ridge extending upwardly on a parabolic curve from said relatively thin leading edge so as to form a relatively sharp line of intersection therebetween.

4. An upper surface for an airplane wing comprising: a forward portion extending rearwardly a relatively short distance on a substantially horizontal plane; a ridge section rising abruptly from said horizontal plane; a valley section following said ridge section; a second ridge section rising above said valley section; and an inclined section extending from said second rear section to the trailing edge of said wing.

5. An airplane wing structure comprising: a relatively flat inclined lower wing surface; an undulating upper wing surface, said undulating upper surface comprising: a forward portion extending rearwardly substantially parallel with and in close proximity to said lower wing surface; a ridge portion rising abruptly above said forward portion to a relatively high, round-topped ridge; a valley portion following said ridge and approaching said lower surface; a second ridge portion following said valley portion and extending away from said lower surface; and an inclined plane portion extending downwardly from said second ridge portion to said lower surface.

6. An airplane wing structure comprising: a relatively flat inclined lower wing surface; an undulating upper wing surface, said undulating upper surface comprising: a forward portion extending rearwardly substantially parallel with and in close proximity to said lower wing surface; a ridge portion rising abruptly above said forward portion to a relatively high, round-topped ridge; a valley portion following said ridge and approaching said lower surface; a second ridge portion following said valley portion and extending away from said lower surface; an inclined plane portion extending downwardly from said second ridge portion to said lower surface; and longitudinal members extending through said wing beneath and along each of said ridge portions.

7. An airplane wing structure comprising: a relatively flat inclined lower wing surface; an undulating upper wing surface, said undulating upper surface comprising: a forward portion extending rearwardly substantially parallel with and in close proximity to said lower wing surface; a ridge portion rising abruptly above said forward portion to a relatively high, round-topped ridge; a valley portion following said ridge and approaching said lower surface; a second ridge portion following said valley portion and extending away from said lower surface; an inclined plane portion extending downwardly from said second ridge portion to said lower surface; longitudinal members extending through said wing beneath and along each of said ridge portions; and a longitudinal member extending between said forward plane surface and said lower surface.

In testimony whereof, I affix my signature.

LEW WALLACE GOBBLE.